US009517708B2

(12) United States Patent
Worlitz et al.

(10) Patent No.: US 9,517,708 B2
(45) Date of Patent: Dec. 13, 2016

(54) SEAT ARRANGEMENT FOR A VEHICLE

(71) Applicant: Faurecia Autositze GmbH, Stadthagen (DE)

(72) Inventors: Claudia Worlitz, Hannover (DE); Carsten Reith, Niedernwöhren (DE); Dimitri Unrau, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 14/794,392

(22) Filed: Jul. 8, 2015

(65) Prior Publication Data

US 2016/0046218 A1 Feb. 18, 2016

Related U.S. Application Data

(63) Continuation of application No. PCT/DE2013/100425, filed on Dec. 17, 2013.

(30) Foreign Application Priority Data

Jan. 9, 2013 (DE) .................. 10 2013 000 163

(51) Int. Cl.
*B60N 2/48* (2006.01)
*B60N 2/44* (2006.01)
(Continued)

(52) U.S. Cl.
CPC ............ *B60N 2/4829* (2013.01); *A61H 15/00* (2013.01); *B60N 2/448* (2013.01); *B60N 2/482* (2013.01);
(Continued)

(58) Field of Classification Search
CPC ... B60N 2/4808; B60N 2/4817; B60N 2/4814; B60N 2/4829; B60N 2/448; B60N 2/482; B60N 2/4864; B60N 2/643; A61H 15/00
(Continued)

(56) References Cited

U.S. PATENT DOCUMENTS 5,332,287 A * 7/1994 Whitmyer ................ A47C 7/38
297/405
7,172,253 B2 2/2007 Haverkamp
(Continued)

FOREIGN PATENT DOCUMENTS

DE  10 2008 048 434 A1  3/2010
EP       1 134 114 A2    9/2001
(Continued)

OTHER PUBLICATIONS

International Search Report (ISR) dated May 9, 2014 in PCT/DE2013/100425 (2 pages).
(Continued)

*Primary Examiner* — Milton Nelson, Jr.
(74) *Attorney, Agent, or Firm* — Shlesinger, Arkwright & Garvey LLP

(57) ABSTRACT

Seat arrangement for a vehicle, has a backrest, a headrest which is mounted on the backrest via a height adjustment mechanism, and a neck support which is adjustable in position by use of an adjustment mechanism. The height adjustment mechanism of the headrest and the adjustment mechanism of the neck support may be coupled for a joint adjustment of the headrest and the neck support; and the adjustment mechanism may be decoupled for adjusting only the headrest.

16 Claims, 5 Drawing Sheets

(51) Int. Cl.
*B60N 2/64* (2006.01)
*A61H 15/00* (2006.01)

(52) U.S. Cl.
CPC ........... *B60N 2/4808* (2013.01); *B60N 2/4864* (2013.01); *B60N 2/643* (2013.01)

(58) Field of Classification Search
USPC ........................................ 297/410, 391, 397
See application file for complete search history.

(56) References Cited

U.S. PATENT DOCUMENTS

| | | | |
|---|---|---|---|
| 7,172,255 B2 | 2/2007 | Wanke | |
| 7,273,243 B2 | 9/2007 | Prugarewicz | |
| 7,278,689 B2 | 10/2007 | Guillouet | |
| 7,278,690 B2 | 10/2007 | Bej | |
| 7,390,059 B2 | 6/2008 | Brockschnieder et al. | |
| 7,390,063 B2 | 6/2008 | Behrens | |
| 7,410,219 B2 | 8/2008 | Kraft et al. | |
| 7,416,254 B2 | 8/2008 | Jennings | |
| 7,425,038 B2 | 9/2008 | Deptolla | |
| 7,461,900 B2 | 12/2008 | Lange | |
| 7,479,749 B2 | 1/2009 | Gerding et al. | |
| 7,490,900 B2 | 2/2009 | Szczudrawa | |
| 7,506,939 B2 | 3/2009 | Brockschnieder et al. | |
| 7,517,022 B2 | 4/2009 | Habedank et al. | |
| 7,673,944 B2 | 3/2010 | Behrens | |
| 7,746,011 B2 | 6/2010 | Gerding et al. | |
| 8,950,782 B2 | 2/2015 | Dobruia et al. | |
| 2002/0121803 A1* | 9/2002 | Schooler | B60N 2/0232 297/330 |
| 2004/0075404 A1 | 4/2004 | Gerding et al. | |
| 2006/0055224 A1 | 3/2006 | Wanke | |
| 2006/0061184 A1 | 3/2006 | Jennings | |
| 2006/0108491 A1 | 5/2006 | Behrens | |
| 2006/0119158 A1 | 6/2006 | Haverkamp | |
| 2006/0138842 A1 | 6/2006 | Behrens | |
| 2006/0163932 A1 | 7/2006 | Bej | |
| 2006/0175887 A1 | 8/2006 | Behrens | |
| 2006/0214485 A1 | 9/2006 | Brockschnieder et al. | |
| 2006/0237986 A1 | 10/2006 | Brockschnieder et al. | |
| 2006/0261661 A1 | 11/2006 | Kraft et al. | |
| 2006/0290188 A1 | 12/2006 | Guillouet | |
| 2007/0013212 A1 | 1/2007 | Meister | |
| 2007/0063565 A1 | 3/2007 | Habedank et al. | |
| 2007/0069561 A1 | 3/2007 | Schnabel et al. | |
| 2007/0096668 A1 | 5/2007 | Gerding et al. | |
| 2007/0108824 A1 | 5/2007 | Lange | |
| 2007/0126272 A1 | 6/2007 | Deptolla | |
| 2007/0222263 A1 | 9/2007 | Szczudrawa | |

FOREIGN PATENT DOCUMENTS

| | | | |
|---|---|---|---|
| EP | 1 580 067 B1 | 1/2010 | |
| IT | EP 0113645 A2 * | 7/1984 | ........... B60N 2/4817 |
| JP | H01 161650 U | 11/1989 | |
| JP | H06 184 U | 1/1994 | |
| JP | 2008 194298 A | 8/2008 | |

OTHER PUBLICATIONS

Translation of the Written Opinion of the International Searching Authority, dated Jul. 9, 2015 (12 pages).

* cited by examiner

SEAT ARRANGEMENT FOR A VEHICLE

CROSS-REFERENCE TO RELATED APPLICATION

This application is a continuation of application no. PCT/DE2013/100425, filed 17 Dec. 2013, and this application claims the priority of German application no. DE 10 2013 000 163.3, filed 9 Jan. 2013, and each of which is incorporated herein by reference.

FIELD OF THE INVENTION

The invention relates to a seat arrangement for a vehicle.

BACKGROUND OF THE INVENTION

These types of seat arrangements in vehicles traditionally have a backrest, fastened to a seat part, on which a padded headrest is situated on the top side of the backrest that is used to protect the head of a user, for example during heavy braking or in the event of an accident. For fastening the headrest to the backrest, two holding rods which are inserted into cylindrical sleeves at the top side of the backrest are customarily fixed to the headrest. The holding rods may be moved in the sleeves by hand or motorized operation, for example, so that the height of the headrest may be adjusted.

To increase comfort, such a seat arrangement may additionally have a padded neck support which supports the neck of the user. For adapting the neck support to the user, the neck support has a movable design and is equipped with an adjustment mechanism which allows the neck support to be easily adjusted by the user.

A seat arrangement of this type is disclosed in EP 1 134 114 A2. In this document it is provided to situate a padded part, which has an adjustable inclination and an ergonomic shape that conforms to the contour of the back of the head and neck, on the front side of a height-adjustable headrest. To adapt the padded part to the particular user and adjust the inclination of the vehicle seat, the headrest has a pivot device with which the inclination of the padded part may be adjusted.

In that seat arrangement, it is disadvantageous that the padded part for the neck and head area has a one-piece design. As a result, the padded part continually rests against the neck of the user, and cannot be "folded back" independently of the head part.

A further generic seat arrangement is disclosed in EP 1 580 067 B1. In the cited document, it is provided to fix a padded neck support to a headrest of the seat arrangement via rotary arms. The rotary arms are each rotatably supported, on the side of the headrest, on a transverse shaft which extends through the headrest, and from there extend downwardly in the direction of the neck of the user. The padded neck support is situated between the rotary arms at their ends, and together with the rotary arms may be rotated from a storage position into different use positions, the neck support in the storage position being situated between the backrest and the headrest, thus forming a part of the head support surface. The rotation of the neck support takes place manually by the user. The entire assembly made up of the headrest and neck support is height-adjustably fixed to the backrest of the seat arrangement via holding rods.

A disadvantage of that approach is that the neck support and the headrest must each be individually actuated in order to adjust them.

OBJECTS AND SUMMARY OF THE INVENTION

An object of the present invention, therefore, is to provide a seat arrangement which ensures flexible and secure adjustment of a neck support and a headrest with minimal operating effort.

This object is achieved by a seat arrangement for a vehicle, comprising a backrest, a headrest mounted on the backrest via a height adjustment mechanism, and a neck support adjustable in position by an adjustment mechanism. The height adjustment mechanism of the headrest and the adjustment mechanism of the neck support may be coupled for joint adjustment and may be decoupled for adjusting only the headrest.

This object is likewise achieved by other preferred embodiments described herein.

In the approach according to the invention, it is thus provided that a height adjustment mechanism for adjusting a headrest mounted on a backrest, and an adjustment mechanism of a neck support, likewise fastened to the backrest, may be coupled and decoupled. When coupled, the headrest and the neck support are only adjustable together, while when decoupled, only the headrest is adjustable and the neck support remains in a storage position. Height adjustment is preferably understood to mean the adjustment of the headrest essentially in parallel to the support surface of the backrest. The neck support is preferably pivoted out from the backrest at the front side during an adjustment.

The coupling of the two supports is settable by the user, so that, depending on the preference of the user, for example during the adjustment of the headrest, either only the headrest or the headrest and the neck support together are adjusted.

For the height adjustment, the headrest preferably has at least one holding rod, which is preferably displaceably accommodated in a cylindrical sleeve on the top side of the backrest, so that the headrest may be adjusted, guided by the sleeve. The at least one holding rod protrudes through the cylindrical sleeve into the interior of the backrest.

The adjustment mechanism for adjusting the neck support is preferably designed as a coupler mechanism. The coupler mechanism is in operative connection with the neck support in such a way that, when the adjustment mechanism is actuated, the neck support may be transferred from a storage position into different use positions in which the neck support is securely supported so that it does not swivel back upon contact with the neck.

The adjustment mechanism of the neck support may preferably be coupled to and decoupled from the height adjustment of the headrest in the interior of the backrest; for example, an adjustment element of the coupler mechanism is connectable to the holding rod or to an element of the headrest which is fixed to the holding rod, so that the movement of the headrest may be transferred directly to the coupler mechanism, and vice versa. A motorized drive is preferably provided for adjusting the height of the headrest or the neck support.

This results in the advantage that the headrest and the neck support, depending on the application, are adjustable either dependently of one another or independently of one another, thus increasing the flexibility. Thus, an independent adjustment is advantageous when the user only wants to protect the head, and to this end would like to move the headrest up or down. In contrast, a dependent adjustment is desired in order to adjust the position of the headrest and neck support relative to one another, for example to be able to assume a comfortable, previously set resting position. The adjustment of the two supports relative to one another may take place, for example, based on clinical studies.

A dependent adjustment has the further advantage that the adjustment of both supports can take place using only one actuating apparatus, for example via a motorized drive, wherein a predefined position may be set for the particular user at the touch of a button, using an appropriate control unit, for example. Since only one actuating apparatus is necessary for this purpose, the operating and installation effort as well as the cost may be kept low.

Since conventional vehicle seats already have height-adjustable headrests, the neck support may be easily retrofitted to existing vehicle seats.

Relative terms such as left, right, up, and down are for convenience only and are not intended to be limiting.

The invention is explained in greater detail below with reference to one embodiment and the accompanying drawings, which show the following:

DETAILED DESCRIPTION OF THE INVENTION

The embodiment of the invention described herein relates to a seat arrangement 1 for a vehicle, having a headrest 2 and a neck support 12 which are situated on a backrest, omitted for clarity. The headrest 2 and the neck support 12 in each case traditionally have a housing 2.1, 12.1, respectively, to which a pad or a cushion may be fastened, so that a user may comfortably rest thereon with the head and with the neck.

Figure 1:
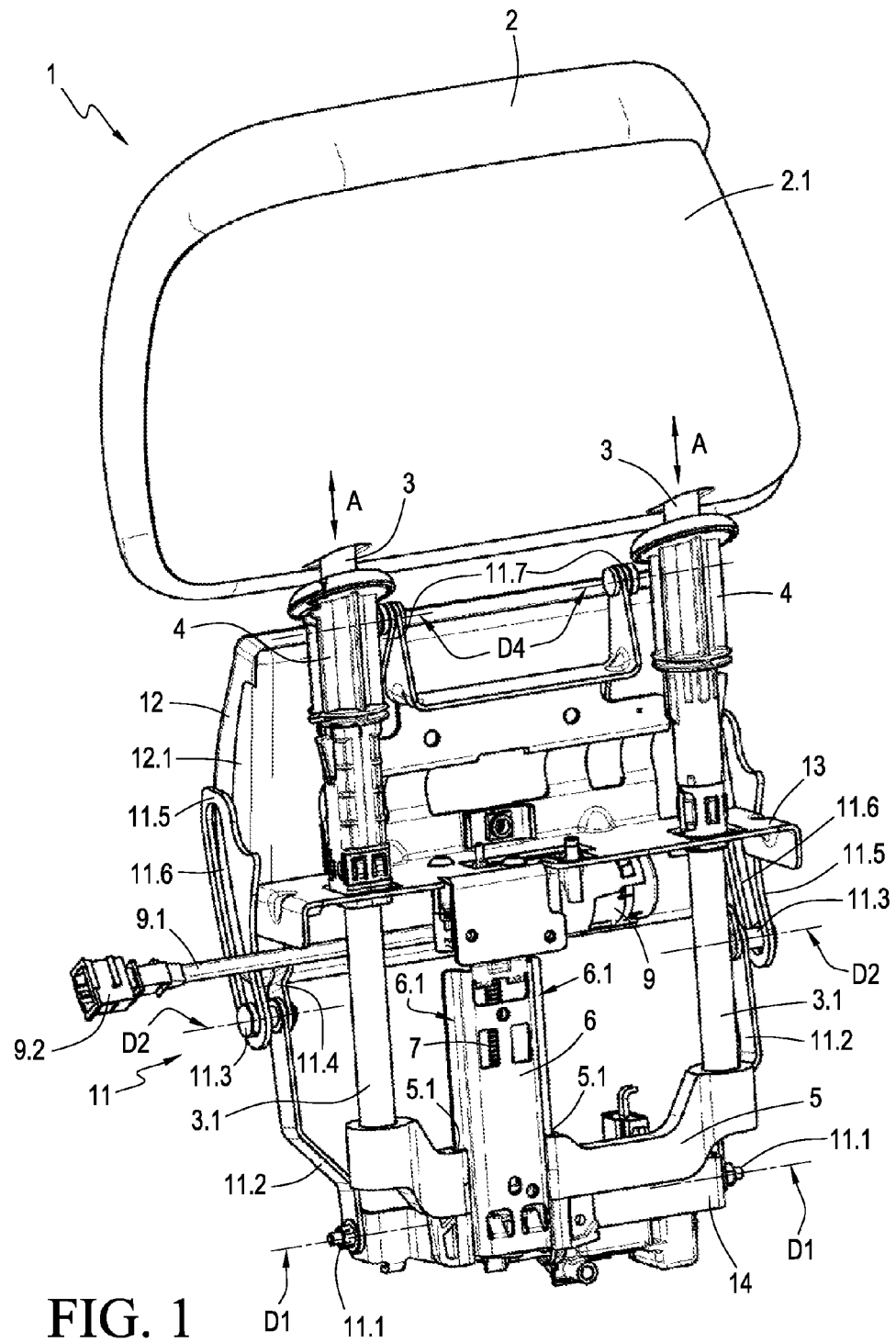
FIG. 1 shows a perspective rear view of an embodiment of a seat arrangement for a vehicle according to the invention.

As illustrated in particular in FIG. 1, two holding rods 3 extending downwardly and in parallel protrude from the housing 2.1 of the headrest 2, and are fixedly connected to the headrest 2. The holding rods 3 are each inserted through cylindrical sleeves 4 which are fixed to the backrest, and which, as is generally known, are fixed to the top side of the backrest of the vehicle seat, so that the ends 3.1 of the holding rods 3 protrude into the interior of the backrest. The holding rods 3 are displaceable in the cylindrical sleeves 4, so that the height of the headrest 2, which is fastened to the holding rods 3, may be adjusted relative to the backrest along a first adjustment direction A (height adjustment mechanism).

The bottom ends 3.1 of the two holding rods 3 are inserted into a bracket 5 which extends essentially perpendicularly with respect to the holding rods 3, and are fastened to the bracket. The element or bracket 5 is displaceably supported on a profiled guide rail 6 which extends parallel to the holding rods 3, two notches 5.1 being provided in the bracket 5 which engage from both sides into an edge area 6.1 of the guide rail 6 in such a way that the bracket 5 is held on the guide rail 6 and can be moved only along the guide rail 6.

Figure 2:
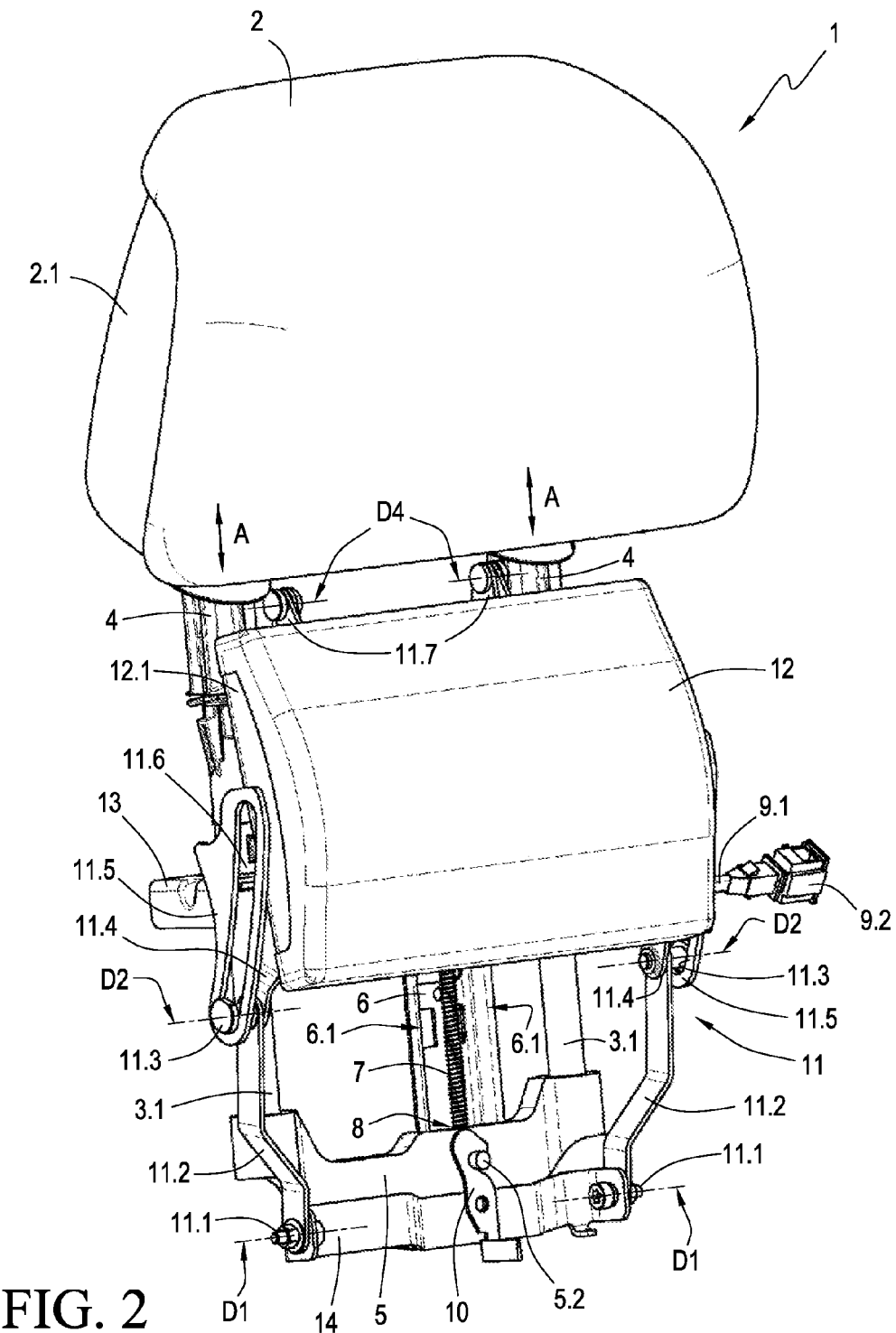
FIG. 2 shows a perspective front view of the seat arrangement embodiment according to FIG. 1.

As is apparent in particular in FIG. 2, a threaded spindle 7 that is fixed to the backrest extends along the guide rail 6. The threaded spindle 7 is screwed into a thread 8 which passes through the bracket 5 and extends concentrically with respect to the threaded spindle 7, so that the bracket 5, guided by the guide rail 6, may be moved up and down by turning the threaded spindle 7, which is fixed to the backrest. Depending on the rotational direction of the threaded spindle 7, the holding rods 3 connected to the bracket 5, and also the headrest 2, may be adjusted up or down along the first adjustment direction A.

According to FIG. 1, the threaded spindle 7 is controlled by a motorized drive 9, which may be supplied with voltage and optionally with additional signals via a control cable 9.1 and a socket 9.2. The control cable 9.1 is led away at the side, and may be connected to a control apparatus (not illustrated) via the socket 9.2, for example. The motorized drive 9 may thus be easily controlled, for example by actuating a switch, and then adjusts the height of the headrest 2 via the threaded spindle 7. However, a non-motorized drive which is in operative connection with the threaded spindle 7, for example via a shaft which is led out from the side of the backrest and actuatable by the user, is also conceivable.

Self-locking may be achieved by appropriate angling of the thread flanks of the threaded spindle 7 and of the thread 8, as the result of which the headrest 2 is automatically held in position without having to actuate the motorized drive 9.

According to FIG. 2, a bolt 5.2 in which a rotatable hook means 10 engages is situated on a front face of the bracket 5. The hook means 10 is rotatably supported on a bracket 14 which extends essentially parallel to the bracket 5, so that the bracket 14 and the bracket 5 are coupled to one another in the position shown in FIG. 2. The bracket 14 is part of an adjustment mechanism 11 of the neck support 12, the adjustment mechanism 11 being designed as follows:

Since the adjustment mechanism 11 of the neck support 12 has the same components 11.1-11.7 on the left and right sides, and has the same design on both sides, in the following discussion only one side is described, which, as is apparent to those skilled in the art, may be easily applied to the other side.

A guide arm 11.2 is articulatedly connected to the bracket 14 at the side via a pin 11.1 or a screw connection 11.1, for example; the screw connection 11.1 defines a pivot point or first pivot point D1 about which the guide arm 11.2 can be rotated. The other end of the guide arm 11.2 is rotatably connected to a support arm 11.4 via a further screw connection 11.3, so that a further pivot point or second pivot point D2 is formed. The support arm 11.4 is rigidly fastened at one side of the neck support 12, and transfers the movement of the support arm 11.4 to the neck support 12.

For the controlled adjustment of the neck support 12, a guide element 11.5 having an elongated hole 11.6 is situated on an element 13 which is fixed to the backrest. The elongated hole 11.6 is slightly curved, and is slightly angled with respect to the first adjustment direction A. The screw connection 11.3, which connects the guide arm 11.2 to the support arm 11.4 in an articulated manner, is accommodated in the elongated hole 11.6. The screw connection 11.3 is thus guided by the elongated hole 11.6, so that the movement of the guide arm 11.2 and of the support arm 11.4 is limited. The displacement travel of the neck support 12 is thus determined, among other factors, by the elongated hole 11.6.

Figure 3:
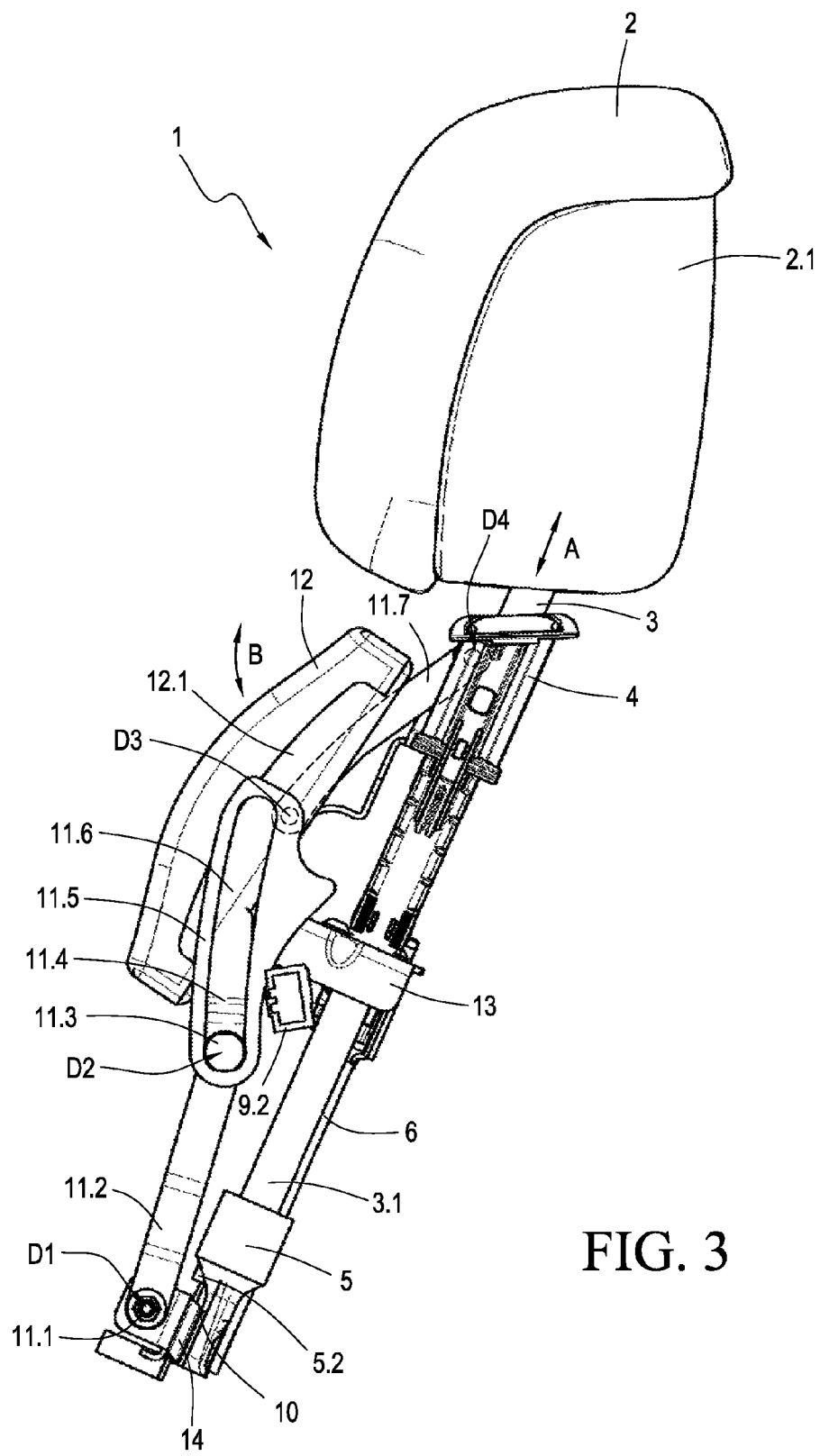
FIG. 3 shows a side view of the seat arrangement embodiment according to FIGS. 1 and 2 in a different position.
Figure 4:
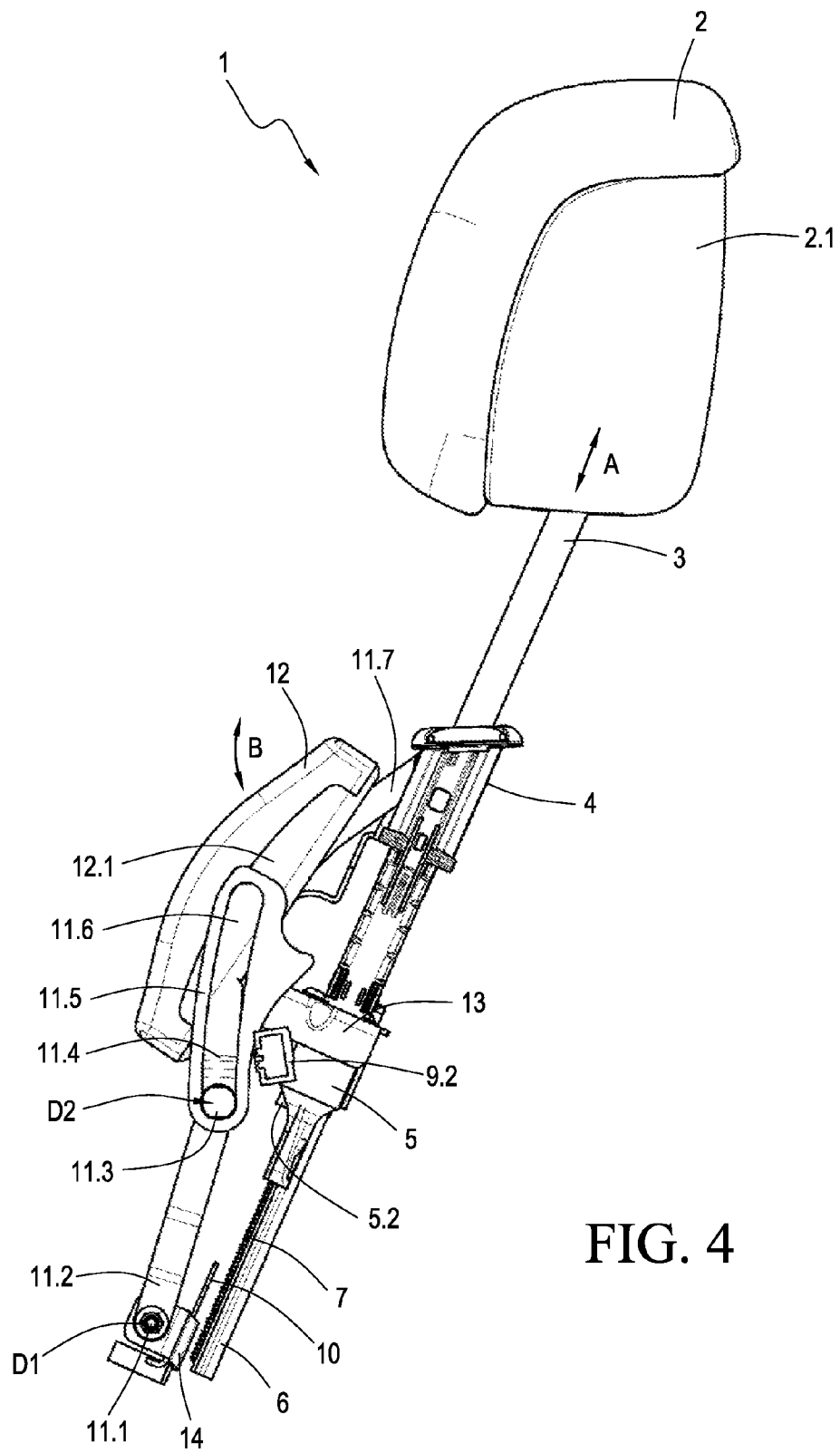
FIG. 4 shows a side view of the seat arrangement embodiment according to FIGS. 1 and 2 in another position.
Figure 5:
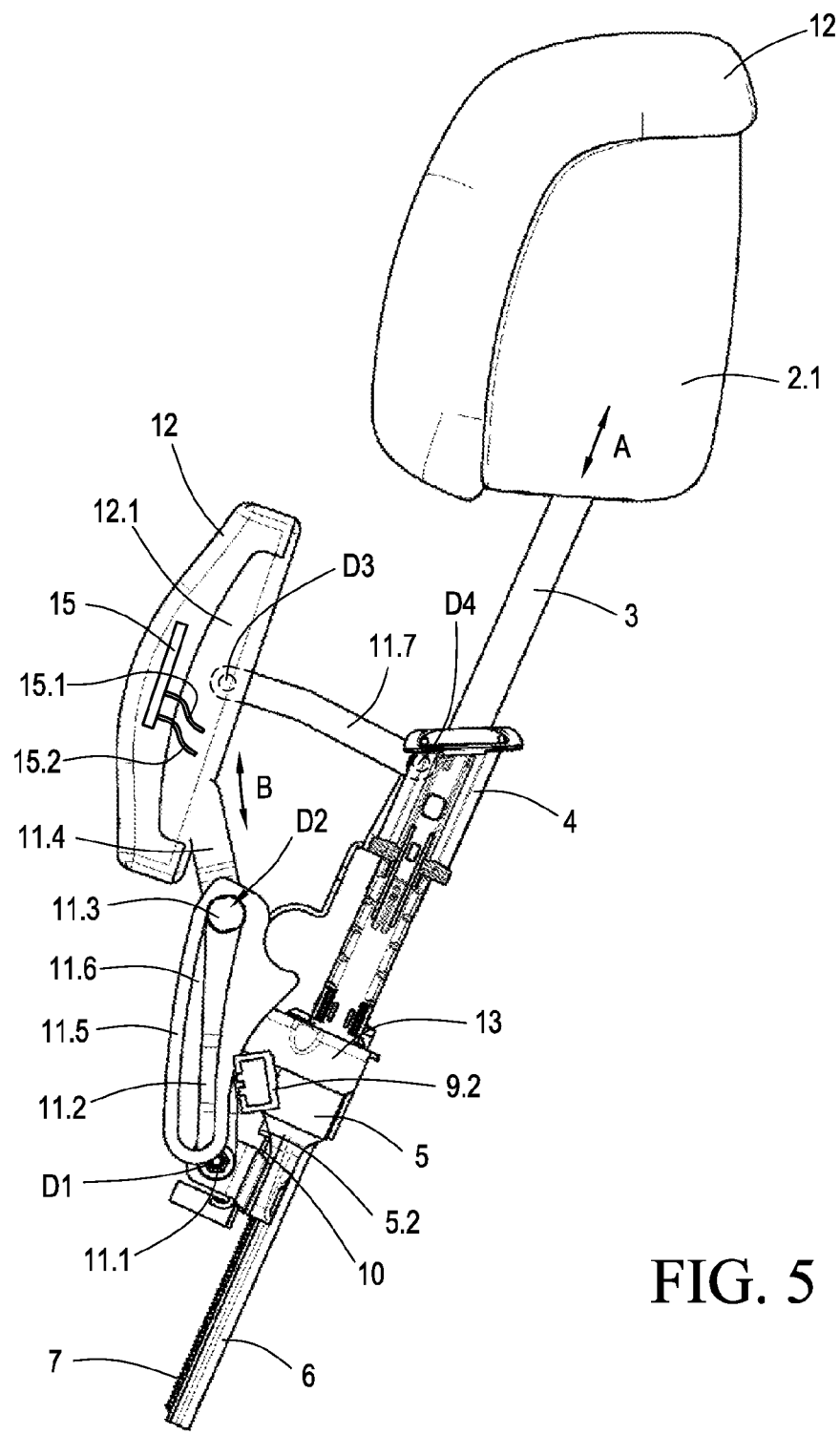
FIG. 5 shows a side view of the seat arrangement embodiment according to FIGS. 1 and 2 in a further position.

To additionally support the neck support 12 and avoid unintentional rotation of the support arm 11.4 about the pivot point D2, a bracing arm 11.7 is provided, as is apparent in particular in FIGS. 3-5, which is articulatedly connected at one end to a pivot point or third pivot point D3 in the upper area of the housing 12.1 of the neck support 12, and at the other end, i.e., an other end, to a pivot point or fourth pivot point D4 at the element 13 which is fixed to the backrest.

When the neck support 12 is adjusted, the bracing arm 11.7 is thus carried along via the pivot point D3, as a result of which the bracing arm 11.7 rotates about the pivot point D4. Since the distance between the adjacent pivot points D3 and D4 is not changeable and the pivot point D4 is fixed to the backrest, rotation of the neck support 12 about the pivot point D2 is limited by the bracing arm 11.7.

As is generally known for a coupler mechanism, the displacement travel of the neck support 12 is clearly defined by the pivot points D1-D4. As a result, the inclination of the neck support 12 in a fixed use position is no longer adjustable (pivot points D1 and D4 are fixed).

The bracing arm 11.7 also ensures that the neck support 12 is adequately supported when the neck rests on it, since the lever of the bracing arm 11.7 may be placed virtually parallel to the direction of the application of force, as illustrated in FIG. 5. Fairly large forces may also be absorbed without unwanted motion of the neck support 12.

According to this embodiment, due to the slight angling of the elongated hole 11.6 the displacement travel of the neck support 12 is directed upwardly into a second adjustment direction B which is angled with respect to the first adjustment direction A; i.e., the neck support 2, as illustrated in FIG. 5, for example, can be adjusted only obliquely upwardly into different use positions; the same applies for returning to the starting position or storage position (FIG. 3).

In the storage position, a support surface of the neck support 12 is, for example, "countersunk" in the backrest, so that the support surface of the backrest (not illustrated) together with the support surface of the neck support 12 forms a joint surface on which the user can comfortably lean. In the use positions, the neck support 12 is adjusted in such a way that the user is able to comfortably rest with the neck on the neck support, and at the same time, with the head on the headrest 2.

In principle, it is also possible to provide only one guided support arm 11.4, one guide arm 11.2, and one bracing arm 11.7 for adjusting the neck support 12. However, a respective double design (on the left and right sides) is advantageous for increasing stability and safety.

Due to the coupling of the two brackets 5 and 14 to one another, the movement, controlled by the user, via the motorized drive 9 may at the same time advantageously be transferred to the height adjustment of the headrest 2 and the adjustment of the neck support 12. As is apparent in FIG. 5, the height of the headrest 2 is thus adjusted and the neck support 12 is moved obliquely upwardly, so that the user may comfortably rest on the neck.

The self-locking effect between the threaded spindle 7 and the thread 8 is likewise transferred to the adjustment mechanism of the neck support 12, so that the neck support also does not unintentionally move back. The neck support 12 and also the headrest 2 may thus be fixed virtually infinitely in different use positions (intermediate positions), so that users of different body sizes may comfortably rest on the neck support 12 and/or the headrest 2.

It is also conceivable for the height of the brackets 5, 14 to be adjusted manually by a user, as in conventional vehicle seats, for example, via a locking adjustment in the cylindrical sleeves 4, into which the holding rods 3 are inserted.

The coupling and decoupling, i.e., the adjustment of the hook means 10, may take place either manually or likewise automatically by a mechanism (actuator, cable pull) not described in greater detail here.

To maintain a suitable distance between the headrest 2 and the neck support 12, the components 11.1-11.7 of the adjustment mechanism 11 are adjusted beforehand corresponding to the user's preference. For fine adjustment, the components 11.1-11.7 may also be finely adjusted after installation, for example by set screws, not shown. For this purpose, clinical studies, for example, may be used to allow an advantageously healthy and comfortable sitting position for the user.

In addition, a massage system 15, for example with massage bubbles, may be installed in the neck support 12 to further increase the comfort and convenience. Supply lines 15.1, 15.2 for a hydraulic system, for example, may be guided, for example, through the interior of the backrest to the housing 12.1 of the neck support 12.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Seat arrangement for a vehicle, comprising:
 a) a backrest;
 b) a headrest mounted on the backrest via a height adjustment mechanism;
 c) a neck support adjustable in position by an adjustment mechanism;
 d) the height adjustment mechanism of the headrest and the adjustment mechanism of the neck support may be coupled for a joint adjustment and may be decoupled for adjusting only the headrest;
 e) the adjustment mechanism of the neck support has at least:
  i) a guide arm for displacing the adjustment mechanism;
  ii) a support arm which is rigidly connected to the neck support;
  iii) a guide element having an elongated hole and which is fixed to the backrest; and
  iv) a bracing arm for bracing the neck support; and
 f) the guide arm, the support arm, the neck support, and the bracing arm form a coupler mechanism which causes the neck support to pivot by displacement of the guide arm.

2. Seat arrangement according to claim 1, wherein:
 a) the height adjustment mechanism is formed by a holding rod which is fixed to the headrest and displaceably accommodated on the backrest.

3. Seat arrangement according to claim 1, wherein:
 a) a massage system for generating massage bubbles is provided in the neck support for massaging a neck of a user.

4. Seat arrangement according to claim 1, wherein:
 a) one end having a first pivot point of the guide arm may be coupled to and decoupled from the height adjustment of the headrest, and an other end having a second pivot point of the guide arm is rotatably connected to the support arm, the second pivot point being displaceably accommodated in the elongated hole of the guide element so that a displacement travel of the support arm is limited by the elongated hole; and b) the bracing arm is rotatably supported at one end having a fourth pivot point on an element which is fixed to the backrest, and at the other end having a third pivot point is rotatably supported on the neck support, so that the neck support is supported and the inclination of the neck support is fixed.

5. Seat arrangement according to claim 1, wherein:
a) the adjustment mechanism and the height adjustment mechanism of the headrest may be coupled via a hook, and the hook may be adjusted one of manually and electrically.

6. Seat arrangement according to claim 1, wherein:
a) the height adjustment mechanism of the headrest is adjusted by an actuating device.

7. Seat arrangement according to claim 6, wherein:
a) the actuating device is a motorized drive which turns a threaded spindle, the threaded spindle being screwed into a thread on a bracket, which is fixed to the headrest, so that the height of the headrest is adjustable by turning the threaded spindle.

8. Seat arrangement according to claim 7, wherein:
a) thread flanks of the threaded spindle and of the thread are angled in such a way that self-locking is achieved, so that automatic turning of the threaded spindle in the thread, and thus unintentional displacement of the headrest, is prevented.

9. Seat arrangement according to claim 7, wherein:
a) the bracket which is fixed to the headrest is displaceably supported on a guide rail which extends parallel to the height adjustment direction for fixing the direction of motion of the bracket which is fixed to the headrest.

10. Seat arrangement for a vehicle, comprising:
a) a backrest;
b) a headrest mounted on the backrest via a height adjustment mechanism;
c) a neck support adjustable in position by an adjustment mechanism;
d) the height adjustment mechanism of the headrest and the adjustment mechanism of the neck support may be coupled for a joint adjustment and may be decoupled for adjusting only the headrest;
e) the height adjustment mechanism of the headrest is adjusted by an actuating device;
f) the actuating device is a motorized drive which turns a threaded spindle, the threaded spindle being screwed into a thread on a bracket, which is fixed to the headrest, so that the height of the headrest is adjustable by turning the threaded spindle; and
g) the bracket which is fixed to the headrest is displaceably supported on a guide rail which extends parallel to the height adjustment direction for fixing the direction of motion of the bracket which is fixed to the headrest.

11. Seat arrangement according to claim 10, wherein:
a) the height adjustment mechanism is formed by a holding rod which is fixed to the headrest and displaceably accommodated on the backrest.

12. Seat arrangement for a vehicle, comprising:
a) a backrest;
b) a headrest mounted on the backrest via a height adjustment mechanism;
c) a neck support adjustable in position by an adjustment mechanism;
d) the height adjustment mechanism of the headrest and the adjustment mechanism of the neck support may be coupled for a joint adjustment and may be decoupled for adjusting only the headrest;
e) the height adjustment mechanism of the headrest is adjusted by an actuating device, the actuating device turns on a threaded spindle having a thread; and
f) thread flanks of the threaded spindle and of the thread are angled in such a way that self-locking is achieved, so that automatic turning of the threaded spindle in the thread, and thus unintentional displacement of the headrest, is prevented.

13. Seat arrangement according to claim 12, wherein:
a) the adjustment mechanism and the height adjustment mechanism of the headrest may be coupled via a hook, and the hook may be adjusted one of manually and electrically.

14. Seat arrangement according to claim 12, wherein:
a) a massage system for generating massage bubbles is provided in the neck support for massaging the neck of the user.

15. Seat arrangement according to claim 12, wherein:
a) the actuating device is a motorized drive which turns the threaded spindle, the threaded spindle being screwed into a thread on a bracket, which is fixed to the headrest, so that the height of the headrest is adjustable by turning the threaded spindle.

16. Seat arrangement according to claim 15, wherein:
a) the bracket which is fixed to the headrest is displaceably supported on a guide rail which extends parallel to the height adjustment direction for fixing the direction of motion of the bracket which is fixed to the headrest.

* * * * *